US 12,098,883 B2

United States Patent
Davidian (10) Patent No.: US 12,098,883 B2
(45) Date of Patent: Sep. 24, 2024

(54) SYSTEM AND METHOD FOR SEPARATING AIR GASES AT LOW PRESSURE

(71) Applicant: L'Air Liquide, Societe Anonyme Pour L'Etude Et L'Exploitation Des Procedes Georges Claude, Paris (FR)

(72) Inventor: Benoit Davidian, Champigny-sur-Marne (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 517 days.

(21) Appl. No.: 17/432,895

(22) PCT Filed: Feb. 12, 2020

(86) PCT No.: PCT/FR2020/050254
§ 371 (c)(1),
(2) Date: Aug. 20, 2021

(87) PCT Pub. No.: WO2020/169901
PCT Pub. Date: Aug. 27, 2020

(65) Prior Publication Data
US 2022/0065530 A1    Mar. 3, 2022

(30) Foreign Application Priority Data

Feb. 21, 2019  (FR) ........................................ 1901731

(51) Int. Cl.
*F25J 3/04*    (2006.01)
*B01D 53/04*   (2006.01)

(52) U.S. Cl.
CPC ...... *F25J 3/04181* (2013.01); *B01D 53/0446* (2013.01); *B01D 53/0462* (2013.01);
(Continued)

(58) Field of Classification Search
CPC .. F25J 3/04181; F25J 3/04775; F25J 2205/60; F25J 2210/06; F25J 2290/12;
(Continued)

(56) References Cited

U.S. PATENT DOCUMENTS 5,176,721 A    1/1993 Hay et al.
5,735,142 A *  4/1998 Grenier ................ F25J 3/04727
                                              62/646
(Continued)

FOREIGN PATENT DOCUMENTS

BR  112021015733 A2 * 10/2021  ......... B01D 53/0407
CN      102046283 A  *  5/2011  ............ B01D 53/02
(Continued)

OTHER PUBLICATIONS

International Search Report and Written Report for PCT/FR2020/050245, mailed May 15, 2020.
(Continued)

*Primary Examiner* — Kun Kai Ma
(74) *Attorney, Agent, or Firm* — Justin K. Murray (57) ABSTRACT

An air gas separation plant comprising, in the direction of circulation of the air stream: a compression means that makes it possible to compress the air stream to a pressure P1 of between 1.15 bar abs and 2 bar abs, an adsorption unit of TSA type, and a cryogenic distillation unit, with the adsorption unit comprising at least two adsorbers A and B each having a parallelepipedal casing arranged horizontally and comprising: an air stream inlet and an air stream outlet, a fixed bed adsorbent mass, likewise of parallelepipedal shape, the faces of which are parallel to the faces of the casing; and a set of volumes allowing the air stream to pass through the adsorbent mass horizontally, over the entire cross-section and throughout the entire thickness thereof.

15 Claims, 4 Drawing Sheets

(52) U.S. Cl.
    CPC ..... *F25J 3/04775* (2013.01); *B01D 2257/404* (2013.01); *B01D 2257/504* (2013.01); *B01D 2257/702* (2013.01); *B01D 2257/80* (2013.01); *B01D 2259/402* (2013.01); *F25J 2205/60* (2013.01); *F25J 2210/06* (2013.01); *F25J 2290/12* (2013.01)

(58) Field of Classification Search
    CPC ............... F25J 3/04866; F25J 3/04169; B01D 2259/405; B01D 53/0446; B01D 53/0462; B01D 2257/404; B01D 2257/504; B01D 2257/702; B01D 2257/80; B01D 2256/10; B01D 2256/12
    See application file for complete search history.

(56) References Cited

U.S. PATENT DOCUMENTS

| | | | |
|---|---|---|---|
| 6,059,863 | A | 5/2000 | Monreau et al. |
| 6,402,809 | B1 | 6/2002 | Monereau et al. |
| 9,358,496 | B2 | 6/2016 | Berges et al. |
| 2005/0217481 | A1 | 10/2005 | Dunne et al. |
| 2006/0210454 | A1 | 9/2006 | Saxena et al. |
| 2008/0148936 | A1* | 6/2008 | Baksh ............ B01J 20/10 95/55 |
| 2012/0058017 | A1 | 3/2012 | Furuyama et al. |
| 2012/0167622 | A1 | 7/2012 | Cognard et al. |
| 2017/0216760 | A1* | 8/2017 | Le Bot ............ C01B 13/0266 |
| 2018/0126319 | A1 | 5/2018 | Ferstl et al. |
| 2019/0137174 | A1 | 5/2019 | Cavagne et al. |

FOREIGN PATENT DOCUMENTS

| | | | | |
|---|---|---|---|---|
| CN | 104162340 | A * | 11/2014 | ......... B01D 53/0462 |
| CN | 108348839 | A * | 7/2018 | ......... B01D 53/0423 |
| DE | 91 00 168 | | 3/1991 | |
| EP | 0453202 | A1 * | 10/1991 | |
| EP | 0 789 208 | | 8/1997 | |
| EP | 1 080 773 | | 3/2001 | |
| EP | 1358924 | A2 * | 11/2003 | ......... B01D 53/0407 |
| EP | 2 752 232 | | 7/2014 | |
| EP | 3643392 | A1 * | 4/2020 | ......... B01D 53/0423 |
| FR | 2 767 716 | | 3/1999 | |
| FR | 2 949 846 | | 3/2011 | |
| FR | 2 981 280 | | 4/2013 | |
| FR | 3 052 242 | | 12/2017 | |
| JP | 3 065 534 | | 7/2000 | |
| WO | WO-2005000447 | A1 * | 1/2005 | ......... B01D 53/0431 |
| WO | WO-2014059190 | A1 * | 4/2014 | ......... B01D 53/0407 |
| WO | WO-2020169900 | A1 * | 8/2020 | ......... B01D 53/0407 |
| WO | WO-2020169901 | A1 * | 8/2020 | ......... B01D 53/0407 |

OTHER PUBLICATIONS

French Search Report and Written Opinion for FR 1 901 731, mailed Dec. 4, 2019.
International Search Report and Written Report for PCT/FR2020/050253, mailed May 15, 2020.
French Search Report and Written Opinion for FR 1 901 732, mailed Oct. 14, 2019.
International Search Report and Written Report for PCT/FR2020/050252, mailed May 13, 2020.
French Search Report and Written Opinion for FR 1901734, mailed Nov. 20, 2019.

* cited by examiner

SYSTEM AND METHOD FOR SEPARATING AIR GASES AT LOW PRESSURE

CROSS REFERENCE TO RELATED APPLICATIONS

This application is a § 371 of International PCT Application PCT/FR2020/050254, filed Feb. 12, 2020, which claims the benefit of FR1901731, filed Feb. 21, 2019, both of which are herein incorporated by reference in their entireties.

FIELD OF THE INVENTION

The present invention relates to a plant for aerial gas separation and to the process for aerial gas separation using said plant. More specifically, it relates to purifying the atmospheric air before separation of said air by cryogenic distillation.

BACKGROUND OF THE INVENTION

It is known that atmospheric air contains compounds that must be removed before it is introduced into the heat exchangers of the cold box of an air separation unit, particularly water vapor ($H_2O$), carbon dioxide ($CO_2$), nitrogen oxides and hydrocarbons.

Indeed, in the absence of such treatment of the air in order to remove its $H_2O$ and $CO_2$ impurities, these impurities solidify when the air is cooled to cryogenic temperature, typically below −150° C., which can result in problems of clogging of the equipment, particularly the heat exchangers, distillation columns, etc.

In addition, it is also customary to at least partially remove the hydrocarbon and nitrogen oxide impurities that can be present in the air in order to prevent the excessive concentration thereof in the bottom of the distillation column(s), and thus mitigate any risk of damage to the equipment.

This pretreatment of the air is currently carried out, as applicable, using the PSA (Pressure Swing Adsorption) process or the TSA (Temperature Swing Adsorption) process. These processes differ in the way in which the adsorbent is regenerated: a pressure effect if said regeneration takes place due to pressure lower than the adsorption pressure, or a temperature effect when it takes place at a temperature higher than the adsorption temperature. It should be noted that there can also be a pressure reduction effect in a TSA unit and that various names can be used in this case. In this document, the term "TSA" is used when a temperature effect is used for regeneration, whether or not there is an additional effect linked to pressure. Conventionally, a TSA process air purification cycle includes the following steps: Purifying the air at above-atmospheric pressure and at ambient temperature, possibly of the order of 5 to 10° C. if refrigeration means are used upstream of the unit a) Depressurizing the adsorber down to atmospheric pressure,
b) Regenerating the adsorbent at atmospheric pressure, particularly using impure nitrogen coming from the air separation unit and heated to a temperature usually between 90 and 250° C. by means of an exchanger, generally an electric heater or a steam heater,
c) Cooling the adsorbent to ambient temperature, particularly by continuing to introduce into it said waste gas originating from the air separation unit, but unheated,
d) Repressurizing the adsorber with atmospheric air or purified air, for example originating from the adsorber that is in the production phase.

Generally, air pretreatment plants comprise two adsorbers, operating alternately, that is, one of the adsorbers is in the production phase while the other is in the regeneration phase.

Additional steps to those described above can be added, such as a step of placing the two adsorbers in parallel, of varying duration, that is, from a few seconds to several minutes, or a waiting step without the circulation of fluids through the adsorbent, for example at the end of the regeneration step.

As pressure facilitates the stopping of the impurities, the purification unit is generally installed after a compression, that is, at a pressure greater than 3 bar abs, frequently at a pressure greater than 4.5 bar abs. This pressure depends on the cryogenic cycle selected for air separation.

The most commonly used cycle is the conventional dual column cycle, in which the air is compressed to a single pressure that corresponds, excluding head losses, to the operating pressure of the so-called medium-pressure column, that is, very generally between 4.5 and 6 bar abs.

More complex cryogenic cycles exist in which the air is used at both medium (MP, typically 4.5 to 9 bar abs) and high (HP, typically 10 to 65 bar abs, or even 90 bar abs) pressures. The highest pressure is obtained either by compressing the appropriate fraction of the medium-pressure air again or by using two compressors (MP, HP) compressing the atmospheric air to the required pressures. It is possible to use two purification units, an MP unit for the fraction of the air directly used at this pressure and an HP unit for the part compressed to high pressure, in order to minimize the volume of adsorbent to be used. This solution is proposed in FR 2949846, with the first pressure between 5 and 9 bar abs, or even between 2 and 4 bar abs. However, for the sake of simplicity and generally due to a smaller investment, the solution that consists of purifying all of the air at MP is usually selected. One example of this type of cycle is described in EP 0 789 208 B1, see in particular FIG. 1, with an MP pressure, after the first compression, of 5 to 6 bar abs. Fractions of the air purified in this way are then boosted.

It will be appreciated that although pressure promotes adsorption, it requires in exchange greater mechanical strength of the equipment related to purification, in particular of the casings of the adsorbers. Several types of adsorber are used for this air purification application: cylindrical adsorber with a vertical axis, cylindrical adsorber with a horizontal axis, radial adsorber. It will be noted that all of the shell rings used are cylindrical. This is because a cylinder is much more resistant to internal pressure than flat surfaces.

As the energy consumed for air separation is essentially linked to the energy necessary for compressing the air, the head losses must be minimized all along the circuits that have an influence on this pressure in order to obtain an optimum specific separation energy. The head losses through the air purification are a not insignificant part of the irreversibilities of the process. There has therefore been an underlying tendency to develop adsorbers having a minimum brake on the circulation of the fluids. The use of the adsorbent in a thin layer and with a large flow area is one of the solutions generally selected regardless of the type of adsorber, but such a choice has drawbacks.

Figures 1A, 1B:
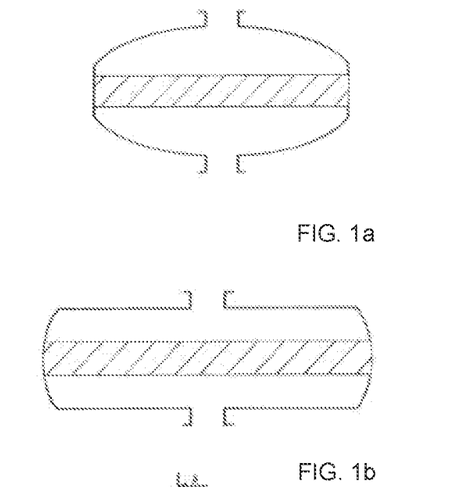
FIG. 1 shows an embodiment of the prior art.
Figure 1C:
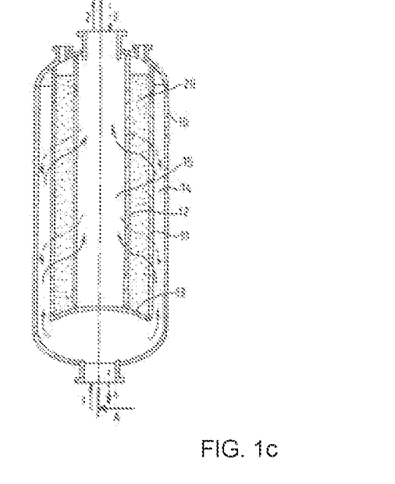

As shown schematically in [FIG. 1], such an arrangement results in large dead spaces on either side of the adsorbent volume. Diagrams 1.*a*, *b* and *c* respectively show cylindrical adsorbers with a vertical axis and a horizontal axis, and a radial adsorber. When they are used in thin layers, the volumes of adsorbent represent only a fraction of the total internal volume of the adsorber, generally less than 50%. This fraction tends to decrease when the size of the adsorbers is increased. Part of these dead spaces is necessary to ensure satisfactory distribution of the air and regeneration gas through the adsorbent volume. As mentioned at the beginning of the document, very fine purification to remove the various impurities is sought for this application, in particular in respect of hydrocarbons, especially propane, and nitrogen oxides, generally to well below one ppm (part per million). This results in large distribution zones at the inlet and outlet of the adsorber in order to have uniform distribution. This also requires particularly small filling tolerances in order to have adsorbent layers of the same thickness and the same density (or the same void fraction), regardless of the path of the fluids through the adsorbent, in order to avoid any air bypass that would pollute production before the end of the purification step.

It will be noted that in the case of radial beds, due to the use of concentric cylindrical meshes, bed thicknesses that are practically identical, to within manufacturing tolerances, can be obtained. Conversely, in the case of cylindrical adsorbers with a vertical or horizontal axis, the free surfaces must be flat after filling and it must be ensured that they stay that way during operation. On areas that can exceed 10 m2, this requires appropriate installation procedures and/or devices.

Although cylindrical adsorbers can be filled relatively efficiently and uniformly due to their geometry, the same is not always true of radial beds, for which equipment developed specially to this end must generally be used and/or removable equipment must be provided in the upper part.

This results in a relatively large investment for this medium-pressure purification, because of the volume of the casing, the thickness of the wall and, when good distribution of the fluids is required through thin beds, the appropriate plant that must be provided. There have therefore been a number of developments to attempt to reduce this cost, in particular proposals to use atmospheric-pressure purification units to replace MP purification or at least to reduce the size thereof.

In particular, systems have been developed with total or partial atmospheric-pressure air purification situated at the intake of the air compressor.

US 2005/0217481 describes such a system using a technology made possible by low pressure, namely Low Pressure Rotary Adsorbent Contactors. This process is said to be suitable for air purification before cryogenic separation. When ultra-high purity (the near-total stopping of impurities) is sought, 3 plants in series must be used.

Still using rotary adsorbent contactor technology, placing in series, before compression, a rotary system intended to remove the majority of the moisture, followed by conventional purification to remove the residual impurities, has been envisaged. Reference can be made to US 2017/0216760 which describes such a dual system, albeit applied to a VPSA.

It should be noted that rotary systems were initially developed to remove some of the moisture from the air at atmospheric pressure in an air conditioning process, and not for fine purification. For these latter applications, they must be adapted by increasing the sealing, both between fluids and to the outside, and increasing the number of stages in series. Industrial production for the application envisaged has yet to occur to our knowledge.

These problems of sealing rotary systems are increasingly troublesome the further away one moves from atmospheric pressure.

It should be noted here that lowering the adsorption pressure from MP to atmospheric pressure has a two-fold, or even three-fold, negative impact. For the same content, the quantity adsorbed is substantially lower, and this is particularly true for CO2, traces of hydrocarbons and nitrogen oxides. This leads to a first increase in the volume of adsorbent. The quantity of water to be captured in atmospheric air is very substantially greater than in MP air. This is because a large part of the water is removed in liquid form at the outlet of the aftercooler of the air compressor in the MP solution. This results in a significant increase in the volume of desiccant. However, the adsorption of this water also results in the heating of the air circulating through the adsorbent, again reducing the capacity to adsorb CO2 and other impurities.

In practice, this means that solutions that consist of placing the air purification at atmospheric pressure are not entirely satisfactory and are used very little. The potential savings on material and technology linked to the use of low pressure are entirely offset by the difficulties that low pressure causes in the capture of impurities.

Hybrid solutions have therefore also been proposed, with partial purification at atmospheric pressure followed by final purification at medium pressure. The final purification unit is smaller than in a conventional solution but having to use two units offsets the benefits that could be expected from such a reduction.

Ultimately, there is currently no purification process that is able to benefit from low-pressure technology and MP purification.

SUMMARY OF THE INVENTION

One solution of the present invention is an air gas separation plant comprising, in the direction of circulation of the air stream:
- a compression means 1 that makes it possible to compress the air stream to a pressure P1 of between 1.15 bar abs and 2 bar abs,
- an adsorption unit 2 of TSA type, and
- a cryogenic distillation unit 3,
- with the adsorption unit comprising at least two adsorbers A and B each having a parallelepipedal casing arranged horizontally and comprising:
- an air stream inlet and an air stream outlet,
- a fixed bed adsorbent mass, likewise of parallelepipedal shape, the faces of which are parallel to the faces of the casing; and
- a set of volumes allowing the air stream to pass through the adsorbent mass horizontally, over the entire cross-section and throughout the entire thickness thereof.

The fluids circulate horizontally through the adsorbent mass. The mass can thus be held between two gas-porous walls for which the spacing tolerances can be very small. Very thin, very uniform bed thicknesses can thus be obtained. As already indicated, it is practically impossible to reach this level of precision with a flat adsorbent bed having a large free surface.

Hereinafter, the length of the adsorber A will be denoted as L, its height as H and its width as l. The cross-section of the adsorbent mass also has a length L and a height H.

The choice of pressure P1 is fundamental in the context of the invention. This pressure must be sufficiently low to permit low-pressure technology for the adsorbers, that is, in practice, adsorber casings with flat surfaces rather than cylindrical casings, but also be substantially higher than atmospheric pressure in order to limit the negative effects listed above. A pressure of 1.5 bar abs for example makes it possible to use parallelepipedal adsorbers, optionally with several reinforcements on the flat surfaces. It also allows a very appreciable improvement compared to an atmospheric pressure solution. The partial pressures of the impurities increase by 50% and, as these impurities are in the form of traces, the adsorption capacity of the adsorbents used also increases, by 50% as an initial approximation. The quantity of water that can be introduced is smaller and the corresponding rise in temperature is smaller.

For the same adsorption time, purification at 1.5 bar abs remains markedly more voluminous than MP purification at 3 or 4 bar abs, but is also far more effective than purification at atmospheric pressure. The use of low-pressure technology for the casing can thus tip the balance in favor of the solution according to the invention.

Here, fixed bed is given to mean that the adsorbent, whether in the form of particles (beads, sticks, granules, wafers, etc.) or structured adsorbent such as for example monolithic, is immobile in a casing that is itself immobile. This excludes any solution in which the adsorbent is mobile and in particular any rotary system such as rotary contact or barrel systems (process in which it is the casings containing the adsorbent that are mobile).

It will be noted that the parallelepipedal shape of the casing of the adsorber A allows for dense, uniform filling of the adsorber without having to use a complex filling system.

It will also be noted that the fact that the adsorbent mass has the gas stream passing through it horizontally and over its entire length means that it is possible to use adsorbent bed thicknesses that are very thin (0.15 m for example) and very uniform.

Depending on the case, the plant according to the invention may have one or more of the features below:

the adsorbers A and B comprise an inlet and an outlet for the regeneration stream; note that the inlet and the outlet for the regeneration stream may be coincident with the inlet and the outlet for the air stream;

at least one of the adsorbents of the adsorbent mass is in the form of particles;

said plant comprises, between the compression means 1 and the cryogenic distillation unit 3, a single adsorption unit;

the set of volumes comprises a first volume V1 for introducing and distributing the air stream; a second volume V2 comprising the adsorbent mass; and a third volume V3 for recovering the purified air stream; the three volumes being contiguous and in fluidic communication via the faces they have in common; as a preference, the 3 volumes V1, V2 and V3 are parallelepipedal in shape and each have a length L, a height letter H, and respective widths l1, l2, l3 where l1<l, l2<l, l3<l;

the second volume V2 comprises at least two sub-volumes containing different adsorbents; these sub-volumes are preferably parallelepipedal in shape and have a height and a length that are equal to the height and to the length of the volume V2;

the volume V1 and/or the volume V3 respectively comprise sub-volumes V11-V12 and V31-V32 which are separated by a perforated wall that improves the distribution of the fluids;

the volumes V1 or V11 and V3 or V32 each have at least one face that is permeable to the fluids, and the adsorber comprises fluid-distribution and fluid-recovery header tanks contiguous with the permeable faces; these distribution and recovery header tanks are preferably semicylindrical in shape; they may improve the mechanical strength of the adsorber and limit the number of reinforcers that might be necessary; for example, the air stream may be admitted via a distribution header tank and the residual gas extracted via a recovery header tank, if that makes installation easier;

the volume V2 or at least one of the sub-volumes of the volume V2 comprises, over the entire length of its top end, a system suitable for avoiding the local potential pollution of the purified air; such pollution may be linked to a bypass or to a regeneration fault;

the adsorption unit comprises N pairs of adsorbers where N≥1, each pair comprising an adsorber A and an adsorber B which are positioned contiguously so as to form a single parallelepiped; as a preference, the adsorbers of the one same pair are installed symmetrically with respect to their adjacent face. When considering the parallelepiped formed by the pair of adsorbers, the volumes relating to the introduction of the air that is to be purified are preferably situated on the outside of the parallelepiped, and the volumes relating to the introduction of the regeneration gas are preferably situated in a central position;

each pair of adsorbers comprises an adsorber A in adsorption mode and an adsorber B in regeneration mode, with all the adsorbers in adsorption mode operating in parallel and all the adsorbers in regeneration mode operating in parallel;

each adsorber A or B, or the A/B adsorber pair, is installed inside an ISO container or inside a container having dimensions and lifting arrangements compliant with ISO standards; note that, as a preference, at least part of the structure of the container acts directly as a structure for the adsorber or adsorbers; as a preference also, at least part of the equipment ancillary to the adsorption, such as the valves and the heater for the regeneration gas, is installed inside the container;

the adsorbers A and B comprise external or internal thermal insulation over at least part of their faces;

the casing of the adsorber A and/or of the adsorber B exhibits a length L of between 2 and 15 meters; a height H of between 1 and 3 meters; and a width l of between 0.5 and 3 meters, preferably of between 0.8 and 1.2 meters.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

The adsorber A of the plant according to invention will be described in greater detail by means of FIG. 3. Specifically, that figure shows the various volumes V1, V2 and V3 and any sub-volumes there might be. A "parallelepipedal shape" is given to mean that in practice, the adsorber casing has six flat faces and has the appearance of a parallelepiped, but that it may have reinforcements, locally at least one internal or external layer of insulation, and obviously pipes or tanks for introducing and withdrawing air and regeneration gas. With the adsorber laid down flat, its longest length is denoted as L, its width as l and its height as H. In the context of the invention, it is not important whether these are external or internal dimensions.

Figure 3:
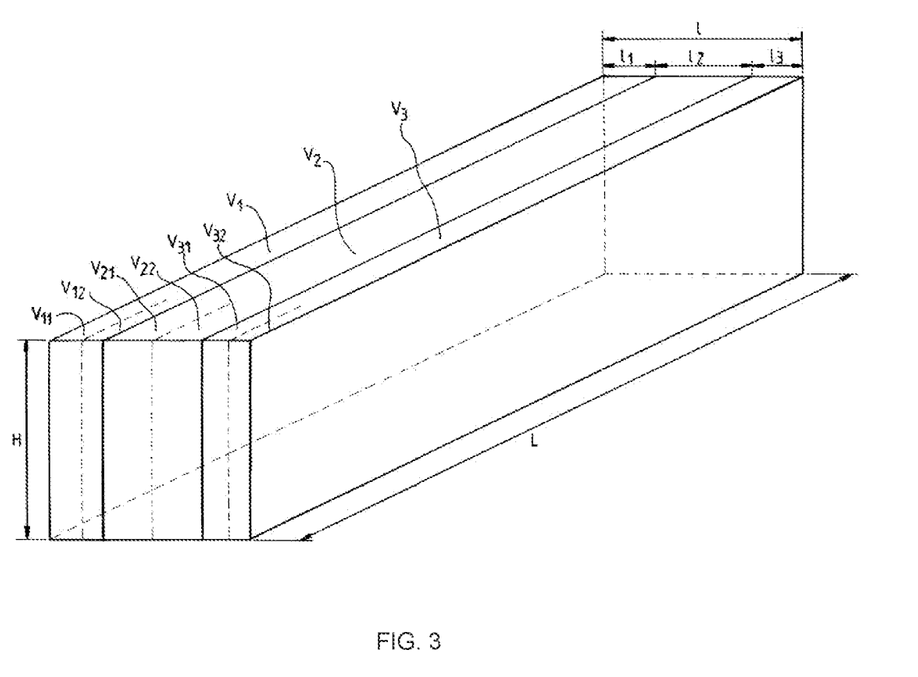
FIG. 3 provides an embodiment of the present invention.

FIG. 3 clearly shows that the volumes and sub-volumes are all of parallelepipedal shape and all have the same length L and the same height H. The parallelepipeds that they form differ from one another only in terms of their width.

As previously indicated, the volume V2 may comprise a plurality of sub-volumes with each of said sub-volumes being able to contain a different adsorbent.

From the inlet toward the outlet it is thus possible to use activated alumina, doped activated alumina or silica gel to capture most of the water, a 13X zeolite to capture most of the CO2, an exchanged zeolite to capture the nitrogen oxides and certain hydrocarbons, etc. The configuration adopted here is easier than in the usual solutions for implementing multi-layer purification with a clearly determined geometric volume for each of the beds. The widths l2$i$ may be of different dimensions. This configuration preferably corresponds to the use of adsorbent in particulate (bead, stick, etc.) form. It would also be possible to use monoliths or, more generally, structured adsorbents, this being with or without the need to have distinct sub-volumes. Indeed, depending on the geometric shape of the structured adsorbents, there is no need to systematically provide separation between elements of different natures which can be placed directly in series.

[FIG. 3] shows a scenario corresponding to 2 sub-volumes V21 and V22. According to another embodiment, the volume V1 and/or the volume V3 respectively comprise sub-volumes V11-V12 and V31-V32 which are separated by a perforated wall that improves the distribution of the fluids. This embodiment is aimed at ensuring good distribution of the air, and likewise of the regeneration gas, across the entire cross-section of the adsorbent. The perforated part between the volumes V11 and V12 on the one hand, and/or between the volumes V31 and V32 on the other hand, allows, at the expense of a slight head loss, an appreciable improvement in the distribution of the fluids entering and/or leaving the layers of adsorbent. The fluidic resistance of the layers of adsorbent themselves thus allows a near-perfect distribution of the flow rates (to within + or −1% if necessary) to be achieved very quickly, after just 1 or 2 centimeters.

In order to ensure the thermal efficiency of the adsorption unit, that is to say in order to limit thermal losses therefrom, one preferred embodiment corresponds to the following feature:

at least certain faces of an adsorber or of an adsorber pair have thermal insulation on the outside or on the inside of the adsorber.

This thermal insulation may employ any one of the conventional insulation materials (perlite, rockwool, expanded foam, etc.) but may also employ measures such as an air film or preferably a double air film system as is conventionally used in adsorbers upstream of cryogenic air separation units. In that case, it is the fluid itself that acts as the insulation.

According to another embodiment, the adsorber A, or the A-B adsorber pair, is installed inside an ISO container or inside a container having dimensions and lifting arrangements compliant with ISO standards.

The adsorber or the two adsorbers are assembled into a specific structure produced in a workshop, which can optionally use part of a standard ISO container. The benefit of complying with ISO standards is that it greatly facilitates handling and transportation. Any reinforcements making the assembly mechanically pressure resistant will be contained within the standard dimensions of the containers.

Bearing in mind the fact that large-sized containers exist, it may be beneficial, in both of the above instances, for the distribution header tanks, some of the piping or valves, the electric heater, etc. to be likewise housed in the container. At least one of the walls of the container (lateral, bottom or top wall) can act directly as a wall for the adsorber itself. In particular, the lateral walls may be incorporated into the distribution volumes V1 and/or V3. More generally, at least part of the structure of the container is used directly as a structure for the adsorber.

The materials used for the adsorbers and their internals are, for example, carbon steel, stainless steel, aluminum, or materials having low thermal expansion, such as INVAR.

The present invention also relates to a method for separating air gases from an air stream containing at least one impurity selected from water vapor, carbon dioxide, nitrogen oxides and hydrocarbons, using a plant as defined above and comprising the following successive steps:

compressing 1 the air stream to a pressure P1 of between 1.15 bar abs and 2 bar abs, purifying the compressed air stream, by adsorption using the TSA unit 2 so as to remove at least one impurity contained in the air stream, and separating the constituents of the air stream by cryogenic distillation using the unit (3), with all of step b) carried out at the pressure P1.

Depending on the case, the method according to the invention may have one or more of the features below:

the pressure P1 is between 1.15 bar abs and 1.5 bar abs, preferably between 1.20 bar abs and 1.30 bar abs;

the method uses a plant as defined hereinabove, and in step b) the air stream is introduced into the volume V1 or the sub-volume V11 and the purified air stream is withdrawn from the volume V3 or from the sub-volume V32. Note that this introduction and/or this withdrawal are preferably performed either horizontally via one or both lateral sides of the casing, or vertically via one or both horizontal faces of the casing, in other words via the top and the bottom of the casing, or via a large face of the casing;

the plant employed comprises in its adsorption unit N pairs of adsorbers A and B, where N≥1, with the adsorbers of each pair being positioned contiguously so as to form a single parallelepiped, and with each pair of adsorbers comprising one adsorber A in adsorption mode and one adsorber B in regeneration mode, the method comprises an additional step d) of regenerating the adsorber B, and in step b), in each adsorber A in adsorption mode, the air stream is introduced into each volume V1 or sub-volume V11 and the purified air stream is withdrawn from each volume V3 or sub-volume V32, and in step d), in each adsorber B in regeneration mode, a regeneration stream is introduced into each volume V3 or sub-volume V32 then withdrawn from each volume V1 or sub-volume V11;

the air or regeneration streams are introduced into or withdrawn from the various volumes V1, V11, V3 and V32 preferably via the sides thereof which are situated in the lateral faces of the parallelepipedal shape of the adsorber A or B, or via the sides thereof which are situated in the bases of the parallelepipedal shape of the adsorber A or B. In fact, the streams may theoretically be introduced/withdrawn via at least one of the 5 faces of the different volumes facing onto the external surroundings (the 2 lateral faces, the top or bottom face, or possibly the main L×H face). As a preference, the lateral faces or via the base. The main face does not encourage distribution and the inside face is not available if 2 adsorbers are positioned contiguously. As the adsorber is filled from the top, the obstacles in the upper part will be avoided.

Figure 2:
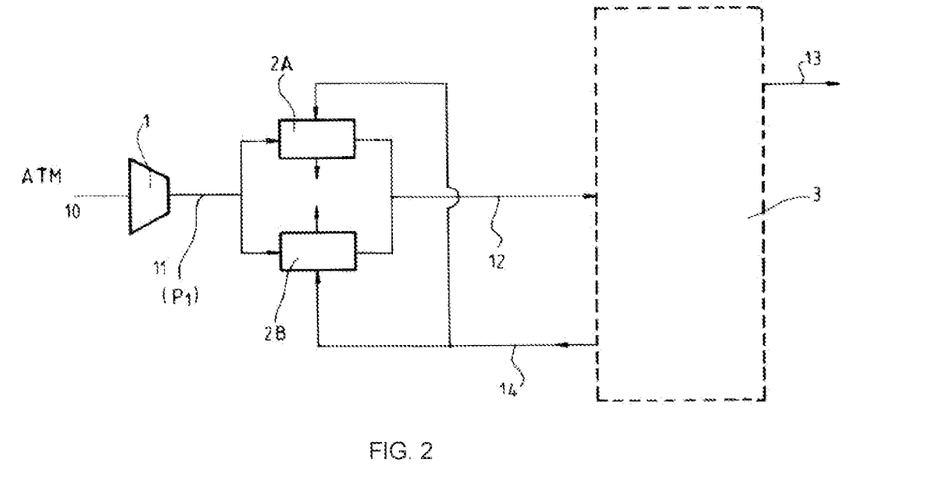
FIG. 2 provides an embodiment of the present invention.

The method according to the invention is illustrated by [FIG. 2]. The atmospheric air 10 containing the various pollutants to be removed is compressed by means of the compressor 1 to the pressure P1, of the order of 1.5 bar abs, and this compressed air 11 is introduced into the adsorber A of the TSA. After purification this purified air 12 is sent into the downstream part of the unit 3, which comprises in particular the cryogenic distillation unit. The regeneration gas 14 originates from this latter unit. It is generally impure nitrogen (that is, containing argon and oxygen) at low pressure, close to atmospheric pressure. This gas—or a fraction of this gas—is heated using one or more heat exchangers (steam, electric, by heat recovery from other fluids, etc.) during the heating step and is then used for cooling the adsorber. The output 13, generally impure oxygen (90-98%) in the case under consideration here, is sent to a downstream unit, not shown.

Regarding the admission and withdrawal of the fluids, one or more of the following features may be present:

the fluids are introduced into or withdrawn from the volume V1—or, as the case may be, the sub-volume V11—horizontally via one or both lateral sides.

the fluids are introduced into or withdrawn from the volume V3—or, as the case may be, the sub-volume V32—horizontally via one or both lateral sides.

the fluids are introduced into or withdrawn from the volume V1—or, as the case may be, the sub-volume V11—vertically via one or both horizontal faces constituting the top or the bottom of the parallelepiped.

the fluids are introduced into or withdrawn from the volume V3—or, as the case may be, the sub-volume V32—vertically via one or both horizontal faces constituting the top or the bottom of the parallelepiped.

In another variant, the fluids are introduced or withdrawn via the large faces (of cross-section L*H) of the parallelepiped. In the latter instance, the circulation of the fluids through the adsorber (V1, V2, V3) is essentially in a straight line from the inlet to the outlet. What that means in particular is that there is no abrupt change in direction, at around 90°, for the fluid between it entering the adsorber and it passing horizontally through the adsorbent volume.

As the fluids circulate horizontally in the adsorbers, some of the constraints specific to radial adsorbers are experienced, and in particular the need to avoid the premature breakthrough of the impurities in the top part of the adsorber. Said breakthrough can originate from a bypass or a local air flow and/or a regeneration fault.

The bypass itself can originate from the compaction of the adsorbent. These problems are well known to a person skilled in the art, and previously developed solutions will be applied here. In particular, as indicated above, due to its geometry, using a parallelepipedal adsorber simplifies the implementation of the solutions envisaged for radial beds (dead zone filled to a sufficient height with adsorbent, equivalent to the cones, etc.). Again, it must be noted that filling is also simplified and that it is easy here to obtain dense, uniform filling by sprinkling, limiting both the compaction and the risk of uneven density in the beds.

Due to the simple geometry, a balloon can for example be used, inflated to a pressure greater than P1, forming a seal above the free surface of the adsorbents. A membrane can also be applied permanently to the free surface of the adsorbents through slight overpressure relative to the operating pressure. This overpressure can originate from a fluid, for example instrument air, or a heavy material. Once again, the solutions developed for the radial adsorbers of units that produce oxygen using adsorption should be adapted to suit.

The following example will illustrate the invention as has just been described.

It relates to an oxygen production unit producing of the order of 100 t/d (tonnes/day) for which an air flow rate of 15,000 Nm3/h is used. The pressure P1 on leaving the first compression stage is 1.3 bar abs. This air is cooled to 3° C. by means of a refrigerating unit in order to limit the quantity of water vapor carried to purification and in order to reduce the adsorption temperature. Here, this temperature is in the low range of the temperature levels used. It was selected mainly due to the low value of P1. Temperatures of 5 to 8° C. could be adopted, particularly if the pressure P1 was slightly higher. The final decision is based on a general cost analysis. The adsorption time applied is 150 minutes, resulting in a cycle time of 5 hours given that the purification unit usually comprises 2 adsorbers, one being in production while the other is in regeneration. Here, these conventional times could be reduced. The cryogenic process applied results in the availability of a significant waste gas flow that can be used for regeneration, which would potentially make it possible to shorten the usual heating and cooling times. In addition, the depressurization and repressurization steps are almost unnecessary given the respective production (1.3 bar abs) and regeneration (1.03 bar abs) pressures. However, the small thickness of the beds of activated alumina and of zeolite, of the order of 0.25 m, did not result in possible optimization being taken further. Production times of 120, 90 or even 60 minutes can be envisaged with air to be purified optionally introduced at a temperature greater than the 3° C. applied in this example. Given the large amount of energy involved in head losses at low pressure, installing an element for regulating the regeneration flow rate based on optimization of the head loss throughout said step can be envisaged. In other words, a higher flow rate is taken when the adsorber is relatively cold, for example at the start of heating and the end of cooling, and a lower flow rate when conversely it is, on average, hottest. It is also, more simply, possible to impose a first flow rate for heating and a lower second flow rate during cooling.

The total volume of adsorbent is of the order of 6 m3 split practically half and half between activated alumina and zeolite X exchanged with calcium and barium, a particularly effective adsorbent for capturing traces of hydrocarbons and nitrogen oxides.

According to the invention, each adsorber is in the form of a parallelepiped with a length L equal to 5.75 m, a height H equal to 2.9 m, and a width l equal to 1.00 m.

The working height of adsorbent is 2.1 m. An anti-pollution system is provided in the top part with an adsorbent reserve in order to compensate for compaction and 10 pipes for filling the volumes V21 and V22 with activated alumina and with zeolite respectively. The fluids are admitted and discharged by the sides. In this instance, what is present is box structures, themselves parallelepipedal, arranged contiguously on each side of the actual adsorber proper.

The inlet and outlet volumes V1 and V3 are not in this instance divided into sub-volumes. The widths available for each of them (0.25 m) allow for direct introduction as the velocity of the fluids is sufficiently low.

The two adsorbers are positioned adjacently with a thermal insulation barrier between the surfaces that face one another. This barrier may consist simply of an air film. One variant might be to retain only a common dividing wall separating the two adsorbers and to use internal insulation on each side. This type of insulation is favored because the circulating fluids in contact with the insulation are dry (purified air, regeneration nitrogen). The adsorbers are created symmetrically so that the volumes V3A of the first adsorber and V3B of the second adsorber are adjacent (discounting the insulation barrier, if that solution is adopted) in the central part.

This description will be explained using [FIG. 4] and [FIG. 5] which respectively depict a transverse section and a longitudinal section through the two adsorbers as installed.

Figure 4:
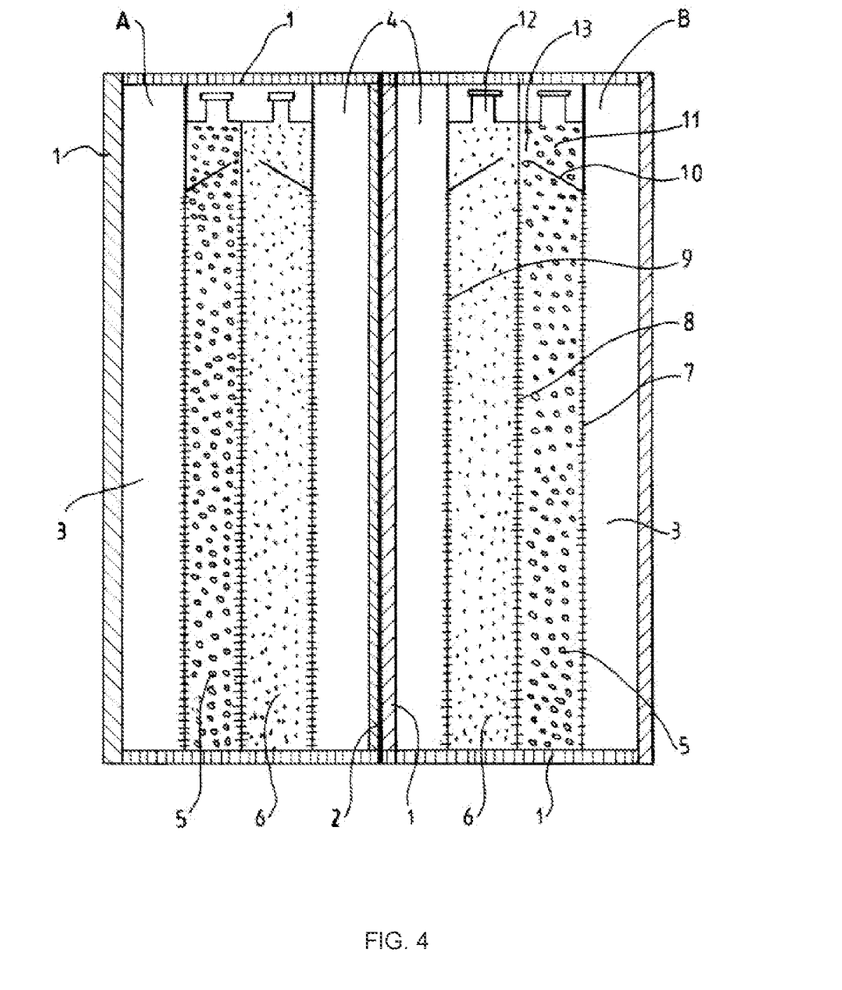
FIG. 4 provides a transverse section through the two adsorbers in accordance with an embodiment of the present invention.

[FIG. 4] thus depicts the two adsorbers A and B. The various references 1' correspond to their exterior casing. They are separated by a barrier 2' that provides thermal insulation. This barrier limits losses of heat from the regeneration stream and the heating of the purified air. Depending on the pressure P1 and the dimensions of the adsorber, it may have mechanical reinforcements to increase the stiffness of the large (L*H) faces of the adsorbers. As has already been described, there are a number of other variant ways in which to achieve this insulation. The references 3' correspond to the volumes V1A and V1B intended for supplying air that is to be purified and extracting the regeneration gas. Likewise, the references 4' apply to the purified-air outlet and the regeneration-gas inlet. The volumes V21A and V21B 5' contain the activated alumina, the volumes V22A and V22B 6' the exchanged zeolite. The walls (7', 8', 9') are permeable to the gases but sealed with respect to particles of adsorbent. These are screens or perforated sheets covered with a metal gauze with a mesh size smaller than the minimum diameter of the particles It is also possible to select screens specially developed for this type of application, of the "wedge wire screen" type, also commonly referred to as Johnson screens after the name of a supplier. The references 10', 11', 12' and 13' correspond to the system intended to compensate for the compaction of the adsorbent and avoid local bypassing of the impurities. A rectangular metal sheet 10' extending from one end of the adsorber to the other delimits a guard bed 11' filled with adsorbent. The angle of the sheet to the horizontal allows the particles passing through the empty space 13' to completely fill the volume situated below this sheet. The adsorbers are filled via the pipes 12' which have a sealing flange at their top end.

Figure 5:
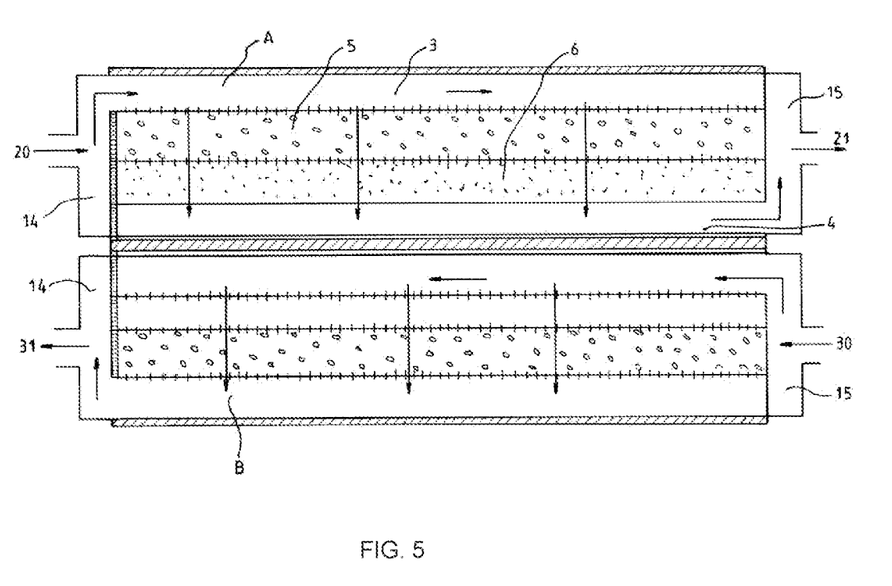
FIG. 5 provides a longitudinal section through the two adsorbers in accordance with an embodiment of the present invention.

[FIG. 5] is a longitudinal section through the adsorbers A and B, the adsorber B being an adsorber A in regeneration mode. It can be used to track the paths followed by the various fluids. It is assumed that the adsorber A is in the production phase. The air that is to be purified 20' enters via the header tank 14' attached to one end of the adsorber A. This air is distributed, partly because of the deflector effect caused by the lateral exterior wall of the adsorber, into the volume V1A. From there, it passes in succession through the exterior permeable wall, the bed 5' of activated alumina, the permeable middle wall, the bed 6' of zeolite and the permeable internal wall. The purified air 21' is collected in the volume V3A then enters the header tank 15' before leaving the system. The other adsorber B is at this time in the regeneration phase. The regeneration gas 30' enters this adsorber via the header tank 15', and follows a path that is the reverse of that of the air, and exits via the header tank 14'. It has been elected here to have the hot regeneration gas enter via the center of the device made up of the two adsorbers. This configuration is not compulsory and, bearing in mind the unavoidable thermal expansions, another arrangement could be adopted. Just one pipe for letting the fluids into and out of the adsorber has been depicted. Depending on the installation, it may be more sensible to provide two distinct pipes, one for the air and the other for the regeneration fluid.

Note that no filter on the outlet side of the adsorbers has been depicted in these drawings. Usually, in this type of application, this would be incorporated into the adsorbers. It is recalled that this is possible because, given the way the fluids circulate between adsorption and regeneration, these filters are self-cleaning, which is to say that they automatically unclog themselves during each cycle. As a preference, the filter is situated in the header tank 15'. It is preferably planar.

One of the benefits of using a low-pressure technology in the construction of the adsorbers is ease of transport between the workshop and the installation site. This facility nevertheless imposes a number of dimensional constraints. Thus, an adsorber will preferably have the following features:

a length L of between 2 and 15 meters; a height H of between 1 and 3 meters; and a width l of between 0.5 and 3 meters, preferably of between 0.8 and 1.5 meters.

In theory, the width of the adsorber and more particularly the thickness of the layers of adsorbent should be limited so that the head losses across said adsorbents remain very small, of the order of a few millibar, possibly of around ten millibar or so.

That means that the two adsorbers can actually be positioned continuously without the overall length exceeding around 3 m.

These constraints that need to be complied with regarding the maximum dimensions of an adsorber mean that the flow rate of air purified by the TSA unit that has just been described is limited, probably to around 30 to 50,000 Nm3/h depending on the exact conditions adopted for the purification. To increase beyond that, it would therefore be necessary to install a number of identical units in parallel.

As indicated hereinabove, this adsorption unit is situated upstream of a cryogenic distillation unit. This unit can in particular be well suited to low-pressure oxygen production, and in particular to the production of oxygen with a purity of between 90 and 98%.

The plant according to the invention also makes it possible to produce small units, that is, from several tens to several hundreds of tonnes per day of oxygen competitively. The compression means 1 could then be common to several units, optionally of different types (boosted air for combustion, for ventilation, etc.).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An air gas separation plant comprising, in the direction of circulation of the air stream:
    a) a compressor configured to compress the air stream to a pressure P1 of between 1.15 bar abs and 2 bar abs;
    b) a cryogenic distillation unit;
    c) an adsorption unit of TSA type comprising at least two adsorbers A and B each having a parallelepipedal casing arranged horizontally,
    wherein the adsorption unit further comprises:
    an air stream inlet and an air stream outlet;
    a fixed bed adsorbent mass, likewise of parallelepipedal shape, the faces of which are parallel to the faces of the casing; and
    a set of volumes allowing the air stream to pass through the fixed bed adsorbent mass horizontally, over the entire cross-section and throughout the entire thickness thereof,
    wherein the set of volumes comprises:
    a first volume V1 for the introduction and distribution of the air stream;
    a second volume V2 comprising the adsorbent mass; and third volume V3 for recovering the purified air stream;
    wherein the first volume, the second volume, and the third volume are contiguous and in fluidic communication via the faces they have in common.

2. The air gas separation plant as claimed in claim 1, wherein said air gas separation plant comprises, between the compressor and the cryogenic distillation unit, the adsorption unit.

3. The air gas separation plant as claimed in claim 1, wherein the second volume V2 comprises at least two sub-volumes containing different adsorbents.

4. The air gas separation plant as claimed in claim 1, wherein the volume V1 and/or the volume V3 respectively comprise sub-volumes V11-V12 and V31-V32 which are separated by a perforated wall that improves the distribution of the fluids.

5. The air gas separation plant as claimed in claim 1, wherein the volumes V1 or V11 and V3 or V32 each have at least one face that is permeable to the fluids, and the adsorber comprises fluid-distribution and fluid-recovery header tanks contiguous with the permeable faces.

6. The air gas separation plant as claimed in claim 1, wherein the adsorption unit comprises N pairs of adsorbers where N≥1, each pair comprising an adsorber A and an adsorber B which are positioned contiguously so as to form a single parallelepiped.

7. The air gas separation plant as claimed in claim 6, wherein each adsorber A or B, or the A/B adsorber pair, is installed inside an ISO container or inside a container having dimensions and lifting arrangements compliant with ISO standards.

8. The air gas separation plant as claimed in claim 6, wherein the adsorbers A and B comprise external or internal thermal insulation over at least part of their faces.

9. A method for separating air gases from an air stream containing at least one impurity selected from water vapor, carbon dioxide, nitrogen oxides and hydrocarbons, the method comprising using the air gas separation plant as defined in claim 1 and further comprising the following successive steps:
    a) compressing the air stream to a pressure P1 of between 1.15 bar abs and 2 bar abs;
    b) purifying the compressed air stream, by adsorption using the TSA unit so as to remove at least one impurity contained in the air stream; and
    c) separating the constituents of the air stream by cryogenic distillation using the unit,
    wherein all of step b) is carried out at the pressure P1.

10. The method for separating air gases as claimed in claim 9, wherein the pressure P1 is between 1.15 bar abs.

11. The method for separating air gases as claimed in claim 9,
    wherein the method further comprises the steps of introducing, in step b), the air stream into the first volume V1 or a sub-volume V11 and withdrawing the purified air stream from the third volume V3 or from a sub-volume V32.

12. The method for separating air gases as claimed in claim 11, wherein:
    the air gas separation plant employed comprises in the adsorption unit N pairs of adsorbers A and B, where N≥1, with the adsorbers of each pair being positioned contiguously so as to form a single parallelepiped, and with each pair of adsorbers comprising one adsorber A in adsorption mode and one adsorber B in regeneration mode,
    the method comprises an additional step d) of regenerating the adsorber B, and
    in step b), in each adsorber A in adsorption mode, the air stream is introduced into each volume V1 or sub-volume V11 and the purified air stream is withdrawn from each volume V3 or sub-volume V32, and in step d), in each adsorber B in regeneration mode, a regeneration stream is introduced into each volume V3 or sub-volume V32 then withdrawn from each volume V1 or sub-volume V11.

13. The method for separating air gases as claimed in claim 9, wherein the air or regeneration streams are introduced into or withdrawn from the various volumes V1, V11, V3 and V32 via the sides thereof which are situated in the lateral faces of the parallelepipedal shape of the adsorber A or B, or via the sides thereof which are situated in the bases of the parallelepipedal shape of the adsorber A or B.

14. An air gas separation plant comprising, in the direction of circulation of the air stream:
   a) compressor configured to compress the air stream to a pressure P1 of between 1.15 bar abs and 2 bar abs;
   b) cryogenic distillation unit:
   c) an adsorption unit of TSA type comprising at least two adsorbers A and B each having a parallelepipedal casing arranged horizontally,
   wherein the adsorption unit further comprises:
   an air stream inlet and an air stream outlet;
   a fixed bed adsorbent mass, likewise of parallelepipedal shape the faces of which are parallel to the faces of the casing; and
   a set of volumes allowing the air stream to pass through the fixed bed adsorbent mass horizontally, over the entire cross-section and throughout the entire thickness thereof,
   wherein the adsorption unit comprises N pairs of adsorbers where N≥1, each pair comprising an adsorber A and an adsorber B which are positioned contiguously so as to form a single parallelepiped,
   wherein each pair of adsorbers comprises an adsorber A in adsorption mode and an adsorber B in regeneration mode, with all the adsorbers in adsorption mode operating in parallel and all the adsorbers in regeneration mode operating in parallel.

15. An air gas separation plant comprising, in the direction of circulation of the air stream
   a compressor configured to compress the air stream to a pressure P1 of between 1.15 bar abs and 2 bar abs;
   b) a cryogenic distillation unit;
   c) an adsorption unit of TSA type comprising at least two adsorbers A and B each having a parallelepipedal casing arranged horizontally,
   wherein the adsorption unit further comprises:
   an air stream inlet and an air stream outlet;
   a fixed bed adsorbent mass, likewise of parallelepipedal shape, the faces of which are parallel to the faces of the casing; and
   a set of volumes allowing the air stream to pass through the fixed bed adsorbent mass horizontally, over the entire cross-section and throughout the entire thickness thereof,
   wherein the adsorption unit comprises N pairs of adsorbers where N≥1, each pair comprising an adsorber A and an adsorber B which are positioned contiguously so as to form a single parallelepiped,
   wherein the casing of the adsorber A and/or of the adsorber B comprises:
   a length L of between 2 and 15 meters;
   a height H of between 1 and 3 meters; and
   a width 1 of between 0.5 and 3 meters, preferably of between 0.8 and 1.2 meters.

* * * * *